US005330690A

United States Patent [19]

Eitel

[11] Patent Number: 5,330,690

[45] Date of Patent: Jul. 19, 1994

[54] PROCESS AND APPARATUS FOR RENEWING THE REFRACTORY LINING OF FOUNDRY LADLES

[75] Inventor: Wilhelm Eitel, Ratingen, Fed. Rep. of Germany

[73] Assignee: Intocast GmbH Feuerfestprodukte und Giesshilfsmittel, Ratingen, Fed. Rep. of Germany

[21] Appl. No.: 916,000

[22] PCT Filed: Jan. 14, 1991

[86] PCT No.: PCT/DE91/00021

§ 371 Date: Aug. 4, 1992

§ 102(e) Date: Aug. 4, 1992

[87] PCT Pub. No.: WO91/12103

PCT Pub. Date: Aug. 22, 1991

[30] Foreign Application Priority Data

Feb. 7, 1990 [DE] Fed. Rep. of Germany ....... 4003646

[51] Int. Cl.[5] ........................ B32B 35/00; C21B 7/06; F27D 1/16

[52] U.S. Cl. ........................................ 264/30; 156/98; 264/32; 264/35; 264/36; 264/80; 264/139; 264/162; 264/265; 264/269; 266/44; 266/271; 266/281; 425/12; 427/140

[58] Field of Search .................................... 264/30-36, 264/267, 80, 269, 265, 139, 162; 425/11-14; 266/44, 281, 271; 427/140; 156/94, 98

[56] References Cited

U.S. PATENT DOCUMENTS

| | | | |
|---|---|---|---|
| 1,376,935 | 5/1921 | Griggs | 266/281 X |
| 3,151,200 | 9/1964 | Spencer | 266/281 |
| 3,365,523 | 1/1968 | Stresino | 264/30 |
| 3,523,714 | 8/1970 | Puhringer | 264/36 |
| 3,944,193 | 3/1976 | Imai et al. | 266/281 |
| 3,970,444 | 7/1976 | Brotzmann et al. | 75/584 |
| 4,190,235 | 2/1980 | Dell | 266/281 X |
| 4,223,873 | 9/1980 | Battles | 266/281 X |
| 4,328,959 | 5/1982 | Holtmann | 266/281 |
| 4,350,324 | 9/1982 | Kramer | 264/30 X |
| 4,690,386 | 9/1987 | Denier et al. | 264/30 X |
| 4,735,398 | 4/1988 | Denier et al. | 264/30 X |
| 4,871,211 | 10/1989 | Aussel | 266/281 X |
| 4,923,180 | 5/1990 | Eitel | 266/44 |

FOREIGN PATENT DOCUMENTS

| | | | |
|---|---|---|---|
| 318701 | 6/1989 | European Pat. Off. . | |
| 1529201 | 7/1971 | Fed. Rep. of Germany . | |
| 2821229 | 11/1979 | Fed. Rep. of Germany | 266/281 |
| 3151479 | 7/1983 | Fed. Rep. of Germany . | |
| 6722 | 2/1974 | Japan | 266/281 |
| 72758 | 5/1982 | Japan | 266/281 |
| 6869 | 2/1983 | Japan | 266/281 |
| 682320 | 8/1979 | U.S.S.R. | 266/281 |
| 975809 | 11/1982 | U.S.S.R. | 266/281 |
| 15604 | 10/1991 | World Int. Prop. O. | 264/30 |

OTHER PUBLICATIONS

CASTAC-L, N-Cast Material for Ladle Lining, Kurosaki Refractories Co., Ltd., Jun. 20, 1991.

Patent Abstracts of Japan, "Cleaning Method of Tundish Lining", Shimada, 61-137656, vol. 10, No. 333 (M-534) [2389] Nov. 12, 1986.

Patent Abstracts of Japan, "Mending Method of Lining Material for Tundish", Hiraoka, 60-261653, vol. 10, No. 138 (M-480) [2195] May 21, 1986.

*Primary Examiner*—Karen Aftergut

*Attorney, Agent, or Firm*—Foley & Lardner

[57] ABSTRACT

A process for renewing the refractory lining of a ladle for casting steel and of similar metallurgical vessels. While the ladle (10) is still hot, the slag (S) still adhering to the inner surface (26) is melted off from the remaining lining (2) with the aid of a high-temperature burner (9) operating under reducing conditions and allowed to run out of the ladle (10) in the molten condition. After cooling, the glassy surface of the remaining lining (2) is roughened. The new refractory lining (30) is then applied by casting, with the aid of a template.

6 Claims, 1 Drawing Sheet

A
B
C
D
E
F

PROCESS AND APPARATUS FOR RENEWING THE REFRACTORY LINING OF FOUNDRY LADLES

BACKGROUND

1. Field of the Invention

The invention relates to a process for renewing a refractory lining in a ladle and an apparatus for accomplishing the process.

2. Description of the Related Art

To an increasing extent nowadays, metallurgical vessels are no longer being lined (faced) with refractory bricks. Instead, a casting technique is used in which a refractory casting material, generally a thixotropically acting casting material, is introduced into the interspace between a template or mold which determines the desired clear interior space of the ladle or other type of metallurgical vessel and the vessel wall to be lined. Due to its thixotropic behavior, the material flows very well under the action of vibrations (generally of the template or mold), even in the case of low water contents, and fills every cavity.

German Offenlegungsschrift 3,741,073 has already disclosed a process in which, at the end of the life of a metallurgical vessel, that is to say after the inner layers of the casting material which have been exposed to the molten metal have worn away, instead of breaking out completely the remainder of the refractory lining, which is of course still serviceable, only the remaining slag residues and the slag-penetrated surface layers of the old lining are superficially removed. This does not involve the production of a geometrically regular surface but an operation in which a so-called slag-stripping robot with tools mounted on movable arms, rolling on the surface and having projecting sintered-carbide studs acts on the surface under the action of vibrations and removes or at least roughens it to the desired extent. During this operation, however, the tools follow the largely existing contour of the old lining. The template is reintroduced into the metallurgical vessel having the old lining cleaned in this way, and the interspace between the template and the old lining is then filled again with thixotropic casting material under the action of vibrations. In this way, it is possible to save up to 50% of the expensive lining material. The preceding machining of the surface of the old lining results in a good bond with the newly applied refractory material.

The known process, however, proves to be too expensive in certain cases. This is the case when the skull, i.e. the slag layer, is so thick that the time involved in removing it and the associated wear of the tools are too great to keep the process cost-effective. In addition, the remaining portion of the refractory lining is subjected to high mechanical stresses by the prolonged action of the tools and cracks can thus arise.

SUMMARY OF THE INVENTION

The object on which the invention is based is to allow the refractory lining of metallurgical vessels to be renewed in an economical manner even in such cases.

This object is achieved by a process for renewing a refractory lining, having a predetermined thickness, of a ladle, the ladle containing at least one of a slag which is adhered to the refractory lining and a slag-impregnated surface layer of the refractory lining. The process includes the steps of: heating the ladle; tilting the ladle on a side thereof such that the ladle is sloped relative to a horizontal plane so that an opening of the ladle is located proximate a lower end of the sloped ladle; melting at least one of the slag and the slag-impregnated surface layer via a high-temperature burner that utilizes pure oxygen and allowing the melted at least one of the slag and the slag-impregnated surface layer to run out of the opening so that after melting has ended, the refractory lining has an exposed glassy surface; cooling the ladle; roughening the exposed glassy surface; and then casting a second refractory lining to adhere to the roughened exposed glass surface of the first refractory lining such that the thickness of the combined first and second refractory linings is approximately the same as the predetermined thickness. The object is also met by an apparatus for renewing a refractory lining of a ladle used for casting metallurgical material, the apparatus including a stand upon which the ladle is removably supported to lie at an angle relative to a horizontal plane so that an opening of the ladle is located proximate a lower end of the angled ladle; a movable high-temperature burner being removably disposed in the ladle and guidable along an inner surface of the ladle, the high-temperature burner being pivotable, rotatable and displaceable along a longitudinal axis of the ladle, the high-temperature burner melting at least one of a slag adhered to the refractory lining and a slag-impregnated surface layer of the refractory lining so that the melted at least one of the slag and the slag-impregnated surface layer exists the ladle via the opening; a device which receives the melted at least one of the slag and the slag-impregnated surface layer exiting the opening; a roughening device for roughening an exposed glassy surface of the refractory lining which exists after the melted at least one of the slag and the slag-impregnated surface layer has exited via the opening; a template lowerable into the ladle such that at times when the template is in the ladle, a space is defined between the template and a portion of the refractory lining which remains after the melted at least one of the slag and the slag-impregnated surface layer exits the opening and the roughening device has roughened the exposed glassy surface; and a feed device for feeding lining material in the space.

At the end of a ladle campaign, i.e. when the renewal of the refractory lining is due, the ladle is laid on the stand as quickly as possible, immediately after the tipping of the slag, while still at the full, casting temperature, in such a way that it slopes slightly outwards and downwards. The retention of the heat contained in the ladle is important for the economic efficiency of the process. A high-temperature burner with a water-cooled lance which can be moved up and down and rotated can be displaced on rails in front of the ladle in the vertical direction of the ladle, such that it is possible to guide the burner in a spiral and helix type path at a suitable distance over the inner surface of the ladle. The burner operates with gas or oil and oxygen and can be operated under reducing conditions, i.e. does not develop any broken fumes. Beginning in the region of the bottom of the ladle, the burner lance can be guided in a circular path in such a way that the adhering slag, slag steel mixtures or steel residues in the region of the bottom and walls of the ladle become highly fluid and flow outwards out of the inclined lower region of the ladle, and out of the outlet of the ladle from which it passes into a slag pot or into a sand bed. In this way, the ladle is cleaned within a few minutes. All that remains on the old refractory lining is a thin, glassy, smooth slag covering which, after the ladle has cooled, is mechanically toughened in order to achieve a good adhesion base for the new lining material. Roughening can be carried out by the abovementioned slag-stripping robot, which partially or completely removes the slag layer and, in either case, leaves behind a rough surface on the old lining.

The template is then reintroduced into the ladle by the method known per se and described above and the interspace between the template and the surface of the lining which remains is filled with new casting material.

By means of the new process, the renewal of the lining can be carried out in the shortest possible tee without high mechanical stresses being checked on the permanent lining and without extensive break-out work.

The melting off of surface layers of the refractory lining of a tundish is known per se from JP-A-60-261653 and JP-A-61-137656. However, what is concerned here is purely the removal of layers, not an overall process with subsequent roughening and replacement of the material removed by new refractory material.

A burner operated with oxygen has flame temperatures in the region of 3000° C. The materials which remain in the ladle and are to be removed, such as slag, slag steel mixtures or steel residues have melting points in the range of about 1000°–1500° C. The temperature of the ladle is in any case still very high from the last casting and the burner does not for instance have to heat up the ladle from ambient temperature. On the contrary, the burner has only to produce the final temperature peak in order to liquefy all the unwanted constituents adhering to the surface, and this is achieved in a short time. Suitable burners, particularly with regard to the burner nozzle, are those which have the features of Gernan Patents 1,529,201 and 3,151,479.

To avoid heat losses, it is advisable to provide a heat shield which closes off the interior of the ladle from the outside during the operation of the burner.

In the preferred illustrative embodiment of the installation, the roughening apparatus known per se from German Offenlegungsschrift 3,741,073 is used. It is, however, also possible to use different roughening apparatuses, for example sand blast blowers or similar particle blowers.

BRIEF DESCRIPTION OF THE DRAWING

In the drawing, the various phases of the treatment of a foundry ladle for steel are shown schematically in vertical section and designated by capital letters as follows:

A shows a freshly-lined ladle;
B shows a ladle lining after numerous casts;
C shows the ladle at an incline and having a high-temperature burner operating therein;
D shows the ladle with a roughing device therein;
E shows the ladle with a template therein and a feed device feeding lining material between the template and lining;
F shows the ladle with a heating device therein for drying the lining material fed in E.

Figure 1:
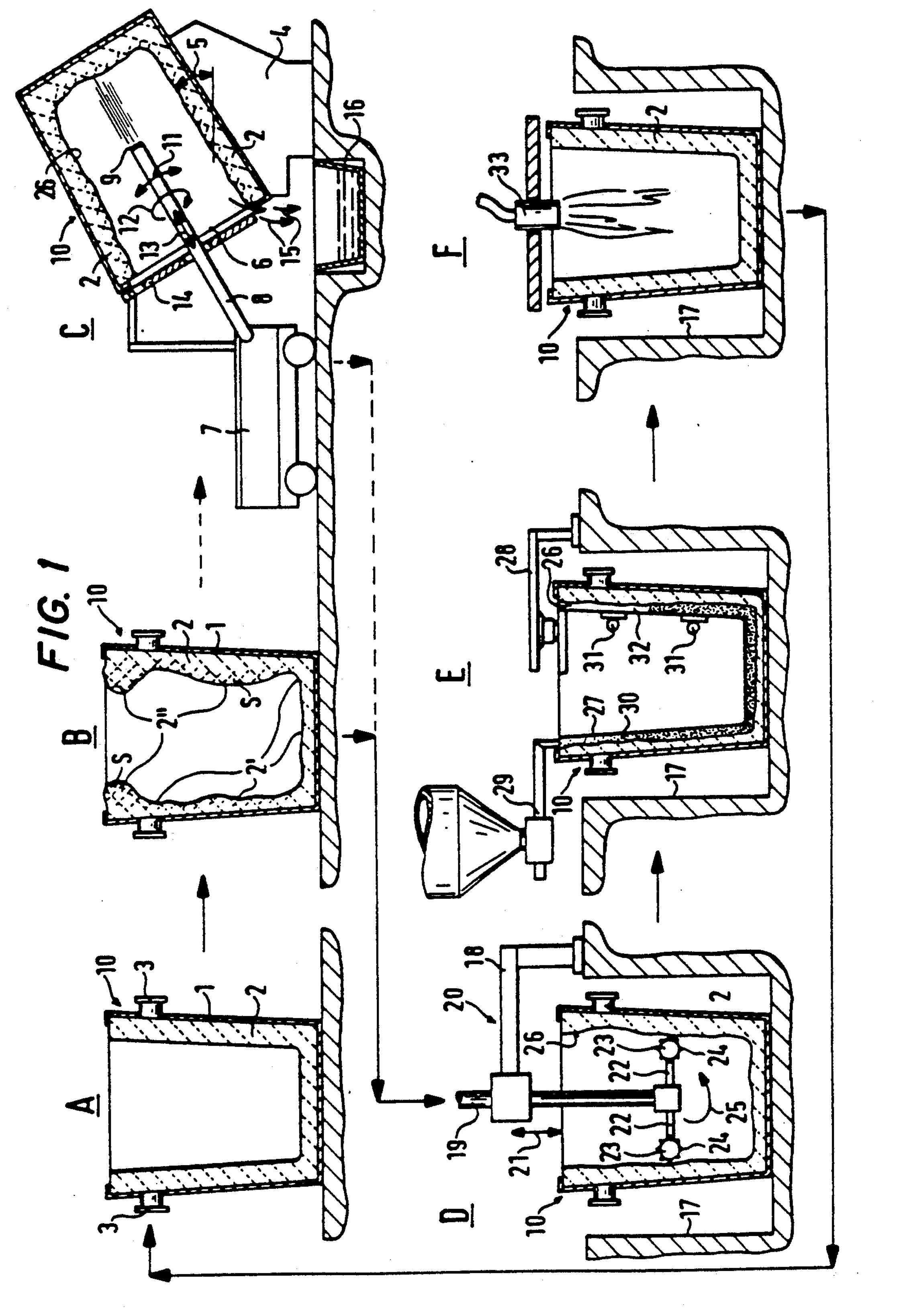

A shows a freshly-lined foundry ladle 10, which comprises a pot-shaped sheet-steel housing 1 with a slight downward taper, to the inside of which is applied a so-called lining or facing of refractory material 2 with an essentially uniform thickness of some 10 centimeters. The ladle 10 can be grasped and moved around by the shop crane by means of lateral projections 3.

In the ladle 10, the steel is subjected to a metallurgical treatment, such as for example by the blowing therein oxygen, argon or the like, and is then poured off. After a number of such treatments or pouring operations, i.e. after such a ladle campaign, the slag is poured off and the lining of the ladle 10 has the appearance shown in B. There are regions 2' in which the wall thickness of the lining 2 has decreased considerably. In other regions 2'', the lining exhibits skulls, i.e. thick slag layers or beads have attached themselves, as indicated by the cross hatching representing the slag S. Steel residues or steel slag mixtures may also be present. Thinner slag layers also adhere in the regions 2' or the surface regions of the lining 2 have been penetrated to a certain depth by slag, reducing their refractoriness. The coarse beads at the upper edge of the ladle are broken out using a suitable apparatus and the ladle is then immediately (i.e. while the lining 2 is still glowing bright red from the last cast) laid down on its side on a stand 4 situated in the vicinity, using the shop crane, such that the wall of the lining 2 assumes an angle 5 of about 5° to 30° to the horizontal in its essentially cylindrical region, the inclination being greatly exaggerated in the schematic representation of the illustrative embodiment. The opening 6 of the ladle 10 faces downwards.

A carriage or car 7 is now brought up on rails, the said carriage or car carrying a lance 8 with a high-temperature burner at the free end, which burner can be inserted into the interior of the ladle 10 and can be both pivoted in accordance with arrow 11 and rotated in accordance with arrow 12 and can be displaced into the ladle 10 in the longitudinal direction of the lance in accordance with arrow 13. The carriage or car 7 furthermore carries a heat shield 14, which covers the opening 6 of the ladle 10.

The high-temperature burner 9 is operated with a suitable gaseous or liquid fuel and pure oxygen and produces flame temperatures in the region of 3000° C., which melt the still red-hot slag, the melting point of which is in the range from 1000°–1500° C., the heat shield 14 preventing heat losses and excessive radiation of heat onto the car 7.

The slag which has been melted out flows downwards out of the opening 6 of the ladle 10 in accordance with arrow 15, into the slag pot 16.

Between phase C and phase D, the ladle 10 has the chance to cool down. The ladle is placed in a pit 17 by means of the shop crane. There is now no longer a slag layer of any appreciable thickness present, for which reason the cross-hatching (see B) has been omitted. However, there is still a thin, glassy, very smooth slag layer, arising from the process of melting the slag out, on the surface of the lining 2 left behind, this layer being at least partially removed and, at the very least, roughened by means of the slag robot 20 in phase D. The slag robot 20 comprises a machine frame 18 which projects over the ladle 10 and on which a vertical column 19 is mounted in such a way that it can be raised and lowered in accordance with arrow 21 and rotated about its longitudinal axis in accordance with arrow 25. Attached to the lower end of the column 19 are pivotable arms 22, on the free ends of which rotatable tools 23 in the form of rollers equipped with sintered-carbide studs 24 are provided which follow the contour of the inner surface of the lining 2 and under the action of vibrators, exert a hammering action on the slag layer and remove or at least roughen it without significantly changing the relief of the inner surface 26 or removing much of the sound material of the lining 2.

In phase E, the slag robot is removed and, instead, a slightly conical template 27 is introduced into the interior of the ladle 10 on a supporting device 28. The template 27 determines the shape of the inner surface of the lining 2, as can be seen from A. Thixotropic refractory lining material 30 is introduced into the interspace between the surface 26 and the template 27 by means of a feed device 29, the said material essentially having the consistency of slightly moist sand but becoming more or less fluid under the action of the vibrators 31 acting on the template 27 and filling the entire interspace 32 between the template 27 and the inner surface 26 homogeneously.

After the removal of the template 27, the refractory material introduced into the interspace 32 is dried by means of a ladle heating device 33 and bonds to the old lining to form a new, compact and homogeneous lining 2, the ladle 10 thus returning to phase A and being able to start a new ladle campaign.

In tests in a 95 tonne steel ladle with an inside diameter of about 2600 mm and an internal height of about 3440 mm, the high-temperature burner 9 used had, as regards, in particular, the design of the nozzle, features of German Patents 1,529,201 and 3,151,479 and was arranged with the outlet of the nozzle approximately in the center of the clear interior space of the ladle, as depicted in C. The high-temperature burner 9 was operated with about 280 $Nm^3/h$ of propane and 900 $Nm^3/h$ of oxygen without the addition of air. It was in operation for about 15 minutes, until the slag had been melted out to a sufficient extent.

We claim:

1. A process for renewing a refractory lining of a ladle, the refractory lining having a predetermined thickness, and the ladle containing at least one of: 1) a slag which is adhered to the refractory lining, and 2) a slag-impregnated surface layer of the refractory lining, the process comprising the steps of:

A) heating the ladle;

B) tilting the ladle on a side thereof such that the ladle is sloped relative to a horizontal plane wherein an opening of the ladle is located proximate a lower end of the sloped ladle;

C) melting at least one of the slag and the slag-impregnated surface layer via a high-temperature burner that utilizes pure oxygen and allowing the melted at least one of the slag and the slag-impregnated surface layer to run out of the opening so that after melting has ended, the refractory lining has an exposed glassy surface;

D) cooling the ladle;

E) roughening the exposed glassy surface; then

F) casting a refractory lining material against the roughened exposed glassy surface to form a renewed refractory lining adhered to the roughened exposed glassy surface of the refractory lining such that a thickness of the renewed refractory lining combined with the refractory lining is approximately the same as the predetermined thickness of the refractory lining.

2. An apparatus for renewing a refractory lining of a ladle used for casting metallurgical material, the apparatus comprising:

a stand upon which the ladle is removably supported to lie at an angle relative to a horizontal plane so that an opening of the ladle is located proximate a lower end of the angled ladle;

a movable high-temperature burner being removably disposed in the ladle and guidable along an inner surface of the ladle, the high-temperature burner being pivotable, rotatable and displaceable along a longitudinal axis of the ladle, the high-temperature burner melting at least one of a slag adhered to the refractory lining and a slag-impregnated surface layer of the refractory lining so that the melted at least one of the slag and the slag-impregnated surface layer exits the ladle via the opening;

a device which receives the melted at least one of the slag and the slag-impregnated surface layer exiting the opening;

a roughening device for roughening an exposed glassy surface of the refractory lining which exists after the melted at least one of the slag and the slag-impregnated surface layer has exited via the opening;

a template lowerable into the ladle such that at times when the template is in the ladle, a space is defined between the template and a portion of the refractory lining which remains after the melted at least one of the slag and the slag-impregnated surface layer exits the opening and the roughening device has roughened the exposed glassy surface; and a feed device for feeding lining material in the space for renewal of the refractory lining.

3. An apparatus as set forth in claim 2, further comprising a heat shield which covers substantially all of the opening and through which heat shield the high-temperature burner passes when disposed in the ladle.

4. An apparatus as set forth in claim 2, wherein the roughening device includes holding arms each having a roller rotatably mounted thereon, and means for vibrating the rollers, the rollers are each equipped with sintered-carbide studs extending therefrom, and means for guiding the rollers along the exposed glassy surface.

5. An apparatus as set forth in claim 2, further comprising a lance upon which the high-temperature burner is mounted, the lance being pivotable, rotatable and movable along the longitudinal axis of the ladle.

6. A process for renewing a refractory lining of a ladle, the refractory lining having a predetermined thickness, and the ladle containing at least one of: 1) a slag which is adhered to the refractory lining, and 2) a slag-impregnated surface layer of the refractory lining, the process comprising the steps of:

A) heating the ladle; then

B) tilting the ladle on a side thereof such that the ladle is sloped relative to a horizontal plane wherein an opening of the ladle is located proximate a lower end of the angled ladle; then C) melting at least one of the slag and the slag-impregnated surface layer via a high-temperature burner that utilizes pure oxygen and allowing the melted at least one of the slag and the slag-impregnated surface layer to run out of the opening so that after melting has ended, the refractory lining has an exposed glassy surface; then D) cooling the ladle; then E) roughening the exposed glassy surface; then F) casting a refractory lining material against the roughened exposed glassy surface to form a renewed refractory lining adhered to the roughened exposed glassy surface of the refractory lining.

* * * * *